(12) United States Patent
Rummler et al.

(10) Patent No.: US 7,774,476 B2
(45) Date of Patent: Aug. 10, 2010

(54) METHODS AND SYSTEMS FOR EXCHANGING DATA USING ONE COMMUNICATION CHANNEL BETWEEN A SERVER AND A CLIENT TO DISPLAY CONTENT IN MULTIPLE WINDOWS ON A CLIENT

(75) Inventors: Zeno Rummler, Eggenstein Leopoldshafen (DE); Franz Müller, Stutensee (DE); Eduard Hess, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1133 days.

(21) Appl. No.: 11/097,048

(22) Filed: Apr. 1, 2005

(65) Prior Publication Data

US 2006/0224743 A1 Oct. 5, 2006

(51) Int. Cl.
*G06F 15/16* (2006.01)
(52) U.S. Cl. ..................................................... 709/227
(58) Field of Classification Search ................. 709/204, 709/220–228, 206, 207, 217, 219; 370/232, 370/234, 238, 252, 231, 230; 715/205, 802, 715/751; 705/5, 6, 28, 26, 44; 707/512, 707/501, 513
See application file for complete search history.

(56) References Cited

U.S. PATENT DOCUMENTS

| | | | | |
|---|---|---|---|---|
| 5,559,942 A | * | 9/1996 | Gough et al. ................ | 715/802 |
| 5,671,428 A | * | 9/1997 | Muranaga et al. ........... | 715/751 |
| 5,794,259 A | | 8/1998 | Kikinis | |
| 5,937,160 A | * | 8/1999 | Davis et al. ................. | 709/203 |
| 6,018,343 A | | 1/2000 | Wang et al. | |
| 6,147,693 A | | 11/2000 | Yunker | |
| 6,243,722 B1 | * | 6/2001 | Day et al. ................... | 715/205 |
| 6,317,143 B1 | * | 11/2001 | Wugofski .................... | 715/765 |
| 6,353,447 B1 | | 3/2002 | Truluck et al. | |
| 6,734,883 B1 | | 5/2004 | Wynn et al. | |
| 6,788,316 B1 | | 9/2004 | Ma et al. | |
| 6,795,097 B1 | | 9/2004 | Yamaguchi et al. | |
| 6,828,989 B2 | | 12/2004 | Cortright | |
| 7,162,698 B2 | | 1/2007 | Huntington et al. | |
| 7,376,739 B2 | * | 5/2008 | Ramaswamy et al. ....... | 709/226 |
| 2003/0088536 A1 | | 5/2003 | Behnia | |
| 2004/0109025 A1 | | 6/2004 | Hullot et al. | |

(Continued)

OTHER PUBLICATIONS

Peter's Date Package—PeterBlum.com [retrieved on Mar. 10, 2008]. Retrieved from the internet: http://web.archive.org/web/20030609225823/http://peterblum.com/DateControls/Home.aspx>.*

(Continued)

*Primary Examiner*—Nathan Flynn
*Assistant Examiner*—Mark O Afolabi
(74) *Attorney, Agent, or Firm*—Finnegan, Henderson, Farabow, Garrett & Dunner, L.L.P.

(57) ABSTRACT

A client may receive first content data and second content data from a server over a communication channel. The first content data may be configured to cause a first window to be displayed on the client. The first window may comprise at least one user selectable element configured to prompt, when selected, the second content data to cause a second window to be displayed on the client. Furthermore, input data entered in the second window may be transmitted from the client to the server, over the same communication channel used to receive the first and second content data.

11 Claims, 11 Drawing Sheets

U.S. PATENT DOCUMENTS

| | | | |
|---|---|---|---|
| 2004/0117349 A1* | 6/2004 | Moricz | 707/1 |
| 2005/0071777 A1 | 3/2005 | Roessler et al. | |
| 2005/0071780 A1 | 3/2005 | Muller et al. | |
| 2005/0235207 A1 | 10/2005 | Albrecht et al. | |
| 2006/0168547 A1* | 7/2006 | Boyles et al. | 715/854 |

OTHER PUBLICATIONS

Peter's Date Package—PeterBlum.com [retrieved on Mar. 10, 2008]. Retrieved from the internet:<URL:http://web.archive.org/web/20030609225823/http://peterblum.com/DataControls/Home.aspx>.

Office Action, USPTO, U.S. Appl. No. 11/097,007, filed Apr. 1, 2005.

* cited by examiner

METHODS AND SYSTEMS FOR EXCHANGING DATA USING ONE COMMUNICATION CHANNEL BETWEEN A SERVER AND A CLIENT TO DISPLAY CONTENT IN MULTIPLE WINDOWS ON A CLIENT

TECHNICAL FIELD

The present invention generally relates to methods and systems for exchanging data between a client and a server. More particularly, the present invention relates to exchanging data using one communication channel between a server and a client to display content in multiple windows on a client.

BACKGROUND

Data may be exchanged between a client and a server over a network. For instance, when the network comprises the Internet, the client may connect with the network using, for example, an Internet browser. Likewise, the server may be connected to the network through a server network access interface ("access interface"). In some situations, the client may access application programs on the server. For example, the client may execute an application program via the access interface on the server over the network through the Internet browser on the client and the server access interface on the server. During execution, the application program may be configured to cause one or more windows to be displayed on the client, while the access interface may be configured to support a separate communication channel for each window displayed on the client. Thus, the conventional strategy is to maintain separate communication channels between the client and the server for each window displayed on the client. Certain access interfaces, however, are not capable of maintaining two communication channels. Such access interfaces are therefore unable to support the application program's ability to maintain more than one window at a time, preventing the user from utilizing the features of applications that are designed to be displayed in a second window.

SUMMARY

Consistent with embodiments of the present invention, systems and methods are disclosed for exchanging data between a client and a server.

In accordance with one embodiment, a method for exchanging data between a client and a server comprises opening a communication channel between the client and the server. The method further comprises transmitting first content data and second content data from the server to the client through the communication channel. The first content data is configured to cause a first window to be displayed on the client. The first window comprises at least one user selectable element configured to prompt, when selected, the second content data to cause a second window to be displayed on the client.

According to another embodiment, a system for exchanging data between a client and a server comprises a memory storage for maintaining a database and a processing unit coupled to the memory storage. The processing unit is operative to receive first content data and second content data from a server over a communication channel. The first content data is configured to cause a first window to be displayed on the client. The first window comprises at least one user selectable element configured to prompt, when selected, the second content data to cause a second window to be displayed on the client.

In accordance with yet another embodiment, a computer-readable medium which stores a set of instructions which when executed performs a method for exchanging data between a client and a server, the computer-readable medium executed by the set of instructions comprising opening a communication channel between the client and the server. The set of instructions may further comprise receiving on the client first content data and second content data from a server through the communication channel. The first content data is configured to cause a first window to be displayed on the client. The first window comprises at least one user selectable element configured to prompt, when selected, the second content data to cause a second window to be displayed on the client.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 3 and 4 are screen shots illustrating windows consistent with the principles of the present invention.

DETAILED DESCRIPTION

Figure 1:
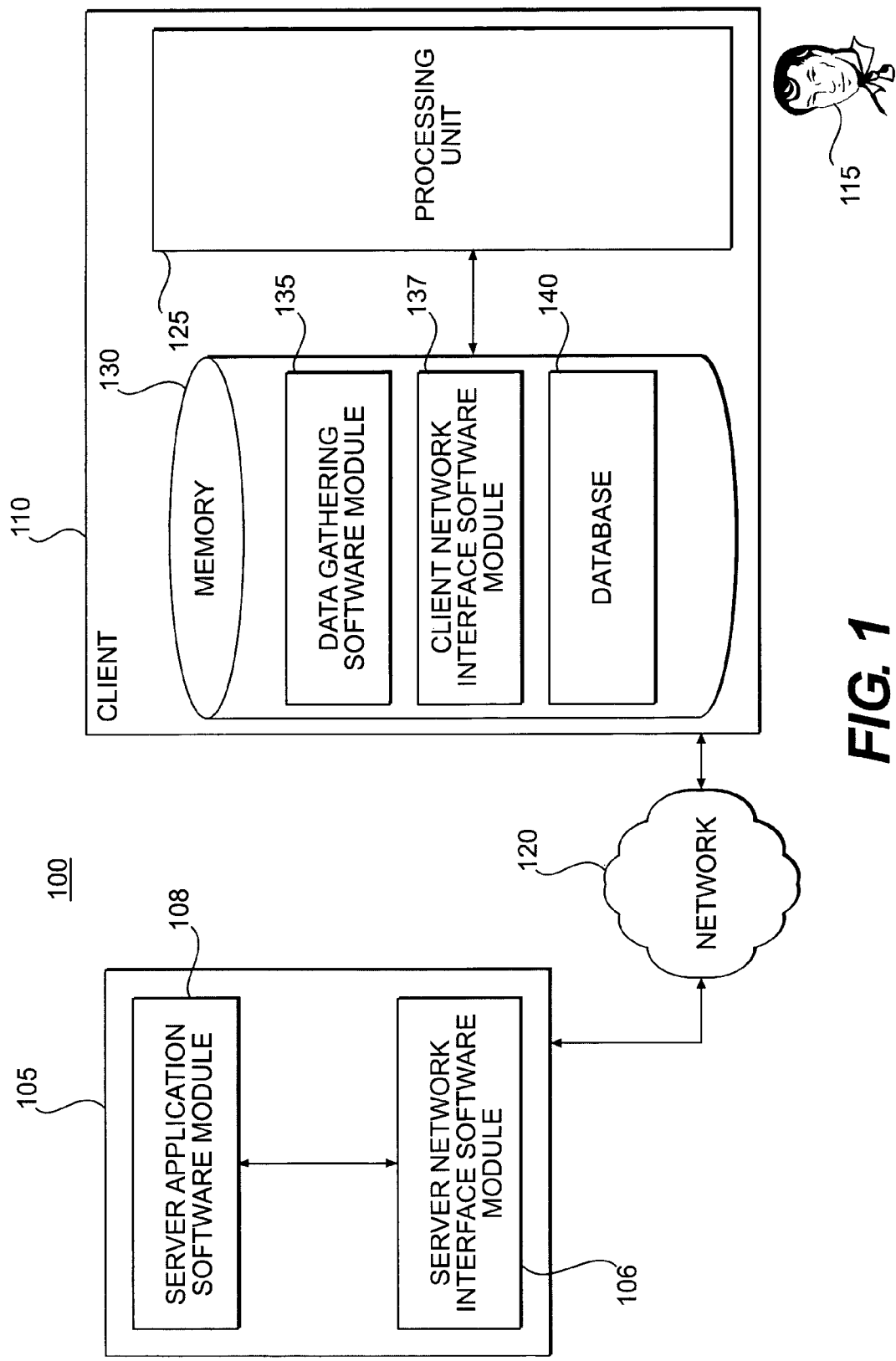
FIG. 1 is a block diagram of an exemplary data exchanging system consistent with the principles of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible without departing from the spirit and scope of the invention. For example, substitutions, additions and/or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the principles of the present invention exchange data between a client and a server. More particularly, the system exchanges data through a server network access interface using an application program executed on the server configured to maintain more than one window at a time on the client. For example, a client may execute an application program located on a server. In order to accomplish this application program execution, the client and server may communicate over a network. To carry out this network communication, the client may connect to the network using an Internet web browser, and the server may connect to the network using an access interface. During execution, the application program may attempt to display more than one window on the client. In some instances, the access interface may not support the application program in displaying more than one window on the client. In this case, the communication between the client and server may fail.

Consistent with the principles of the present invention, when a first (or primary) window associated with the application program is opened on the client, data associated with content for display on a second window associated with the first window may flow to the client through a first communication channel associated with the first window. If a user selects a user selectable element on the first window directed toward causing the second window to be displayed on the client, the second window is caused to be displayed by the client and not by the server. In other words, a second communications channel associated with the second window need not be established between the client and the application program. For example, a second communication channel associated with the second window need not be established, rather any data associated with the second window displayed on the client may be communicated to the application program using the first communication channel associated with the first window. Accordingly, only one communication channel need be established for data associated with both the first and second windows. A second communication channel need not be established for data associated with the second window; instead, data associated with the second window may flow to the application through the first communication channel associated with the first window. Consequently, the access interface only needs to support one communication channel to the client and communication between the client and server will not fail, even though it appears that two communication channels are open simultaneously.

An embodiment consistent with the principles of the invention may comprise a system for obtaining data from an access interface. The system may comprise a memory storage for maintaining a database and a processing unit coupled to the memory storage. The processing unit may be operative to receive first content data from a server, the first content data configured to cause a first window to be displayed, the first window comprising at least one user selectable element configured to cause, when selected, a second window to be displayed wherein second content data for the second window is supplied from the memory storage. Furthermore, the processing unit may be operative to transmit, to the server through the first window, input data entered in the second window.

Consistent with the principles of the present invention, the aforementioned memory, processing unit, and other components may be implemented in a data exchanging system, such as an exemplary data exchanging system 100 of FIG. 1. Any suitable combination of hardware, software and/or firmware may be used to implement the memory, processing unit, or other components. By way of example, the memory, processing unit, or other components may be implemented with any of a server 105 or client 110, in combination with system 100. The aforementioned system and processors are exemplary and other systems and processors may comprise the aforementioned memory, processing unit, or other components, consistent with embodiments of the present invention.

Furthermore, the data exchanging system may be practiced in an electrical circuit comprising discrete electronic elements, packaged or integrated electronic chips containing logic gates, a circuit utilizing a microprocessor, or on a single chip containing electronic elements or microprocessors. The data exchanging system may also be practiced using other technologies capable of performing logical operations such as, for example, AND, OR, and NOT, including but not limited to mechanical, optical, fluidic, and quantum technologies. In addition, the data exchanging system may be practiced within a general purpose computer or in any other circuits or systems.

By way of a non-limiting example, FIG. 1 illustrates system 100 in which the features and principles of the present invention may be implemented. As illustrated in the block diagram of FIG. 1, system 100 may include server 105, client 110, a user 115, and a network 120. User 115 may be an individual, for example, desiring to interface with server 105 over network 120 using client 110. User 115 may also be an organization, enterprise, or any other entity having such desires.

Server 105 may include a server network access interface software module 106 (e.g. an access interface) and a server application software module 108. While FIG. 1 shows software modules 106 and 108 on one server, they may be placed on separate servers. For example, software module 106 may reside on an Internet Transaction Server (ITS) provided, for example, by SAP AG, Walldorf, Germany. Furthermore, software module 106 may comprise, but is not limited to, R/3 applications. R/3 is an integrated suite of client/server applications also provided by SAP AG, Walldorf, Germany. R/3 may include information systems for manufacturing, distribution, order processing, accounting, and human resources. ITS may, for example, integrate R/3 applications to the world wide web.

Client 110 may include a processing unit 125 and a memory 130. Memory 130 may include a data gathering software module 135, a client network interface software module 137, and a database 140. Software module 135 residing in memory 130 may be executed on processing unit 125, may access database 140, and may implement processes in conjunction with exchanging data such as the method described below with respect to FIG. 2. Notwithstanding, client 110 may execute other software modules and implement other processes. Software module 137 may comprise, but is not limited to an Internet web browser.

Server 105 or client 110 ("the processors") included in system 100 may be implemented using a personal computer, network computer, mainframe, or other similar microcomputer-based workstation. However, the processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

Figure 2:
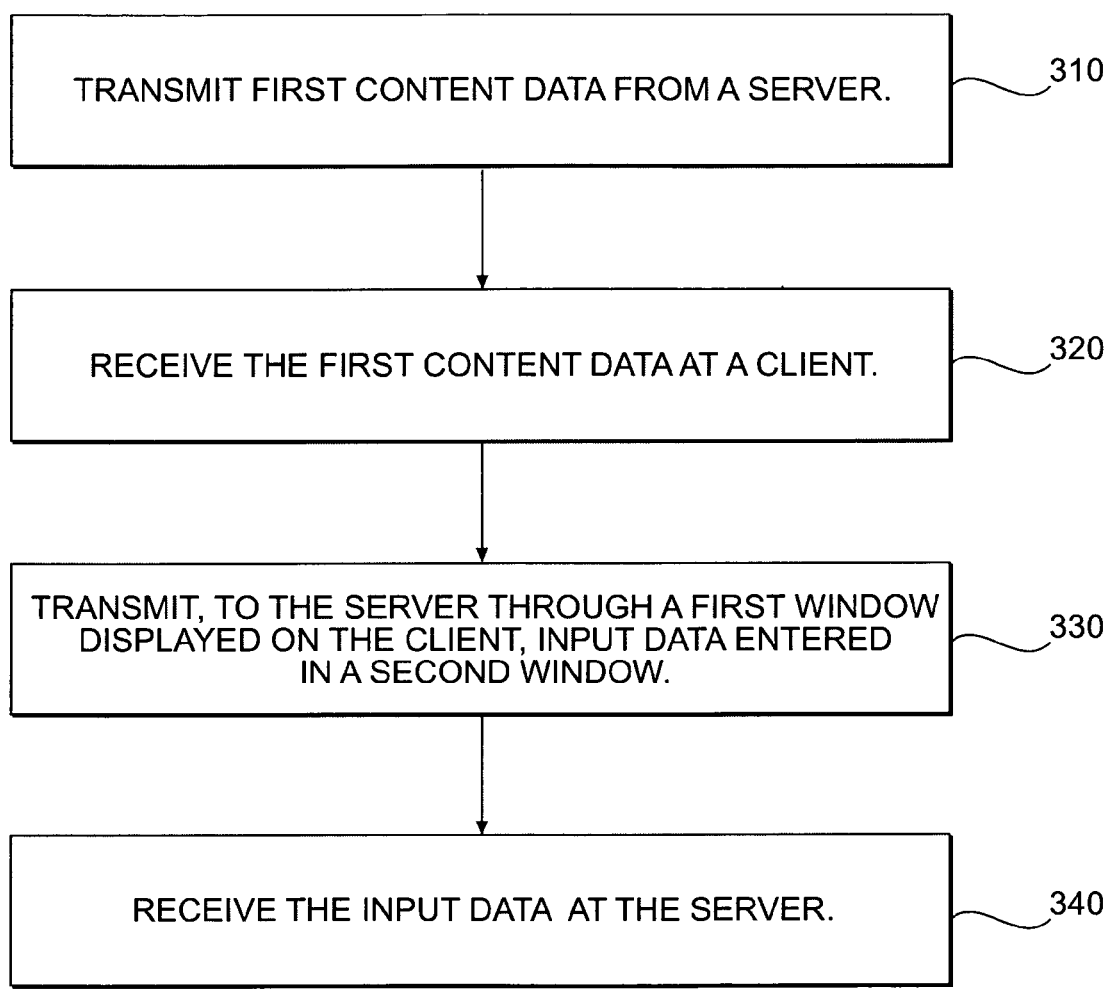
FIG. 2 is a flow chart of an exemplary method for exchanging data consistent with the principles of the present invention.

FIG. 2 is a flow chart setting forth the general stages involved in a data exchange method 300 consistent with the principles of the present invention. Exemplary ways to implement the stages of data exchange method 300 will be described in greater detail below. Server 105 may transmit first content data (stage 310). For example, server 105 may receive a request from client 110 to execute software module 108. In executing software module 108, server 105 may receive a request from client 110 for a first window to be displayed on client 110. In response to the request for the first window, server 105 may transmit first content data through access interface software module 106, and then onto network 120 through a first communication channel.

Next, client 110 may receive the first content data (stage 320). For example, the first content data may be received by client 110 through client network interface software module 137 (e.g. Internet web browser) from network 120. Once received, software module 137 may display the first content data in the first window on a monitor (not shown) connected to client 110.

Once client 110 receives the first content data, data exchange method 300 may transmit input data entered in second window 505 to server 105 through first communication channel (stage 330). For example, after client 110 transmits the input data, server 105 may receive the input data via the first communication channel (stage 340).

Figure 3:
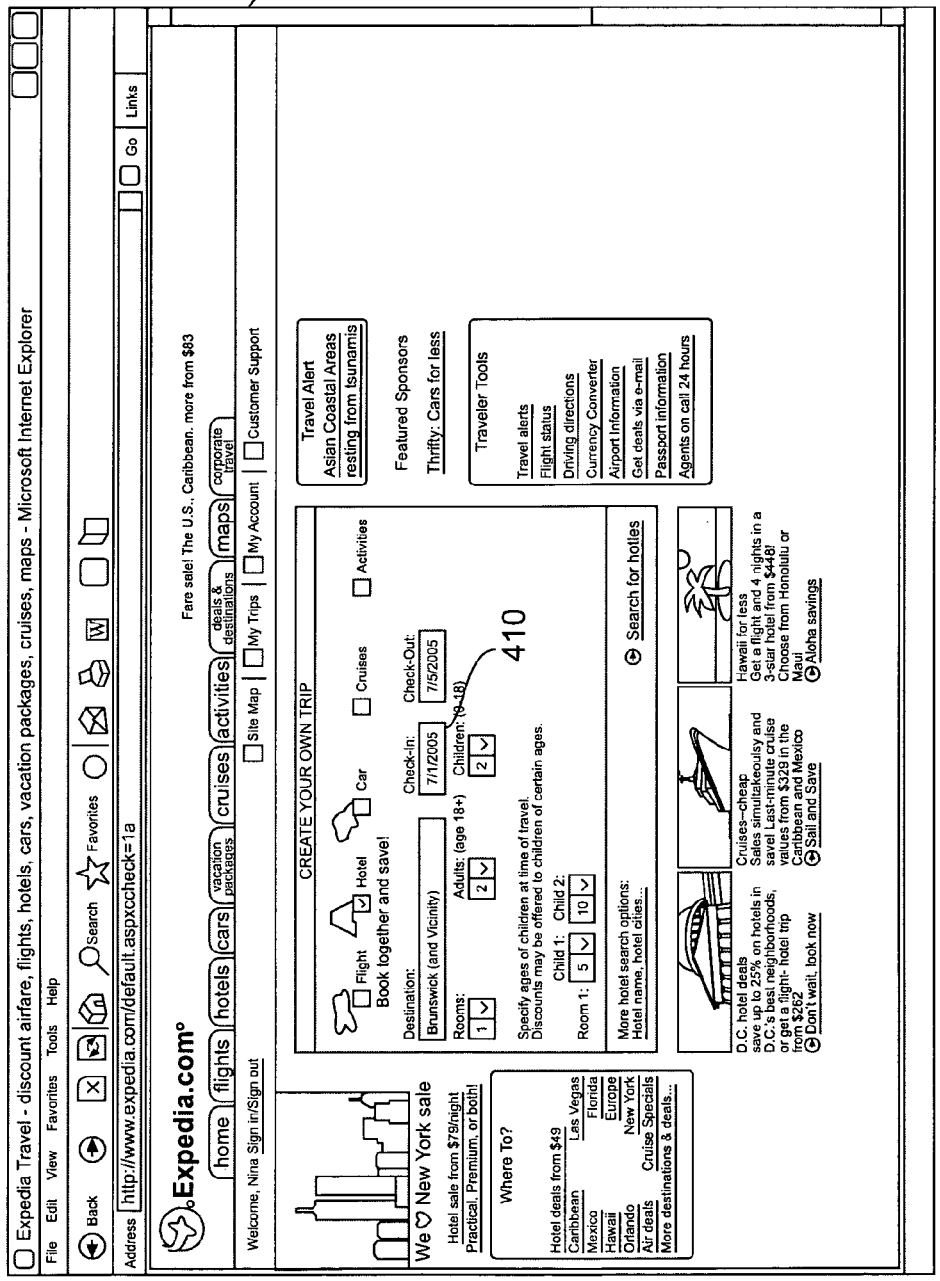

FIG. 3 illustrates that the displayed first content data may comprise a first window 405. First window 405 may include a user selectable element 410 and may request input data from a user 115. For example, server application software module 108 supplying the first content data for window 405 may comprise a computerized hotel reservation program. Accordingly, first window 405 may be directed to obtain data regarding user 115's desired destination and on what days user 115 would like to reserve a hotel room. A date corresponding to the first night user 115 would like a reservation may be entered directly into a field on first window 405 by typing the date into a keyboard.

Figure 4:
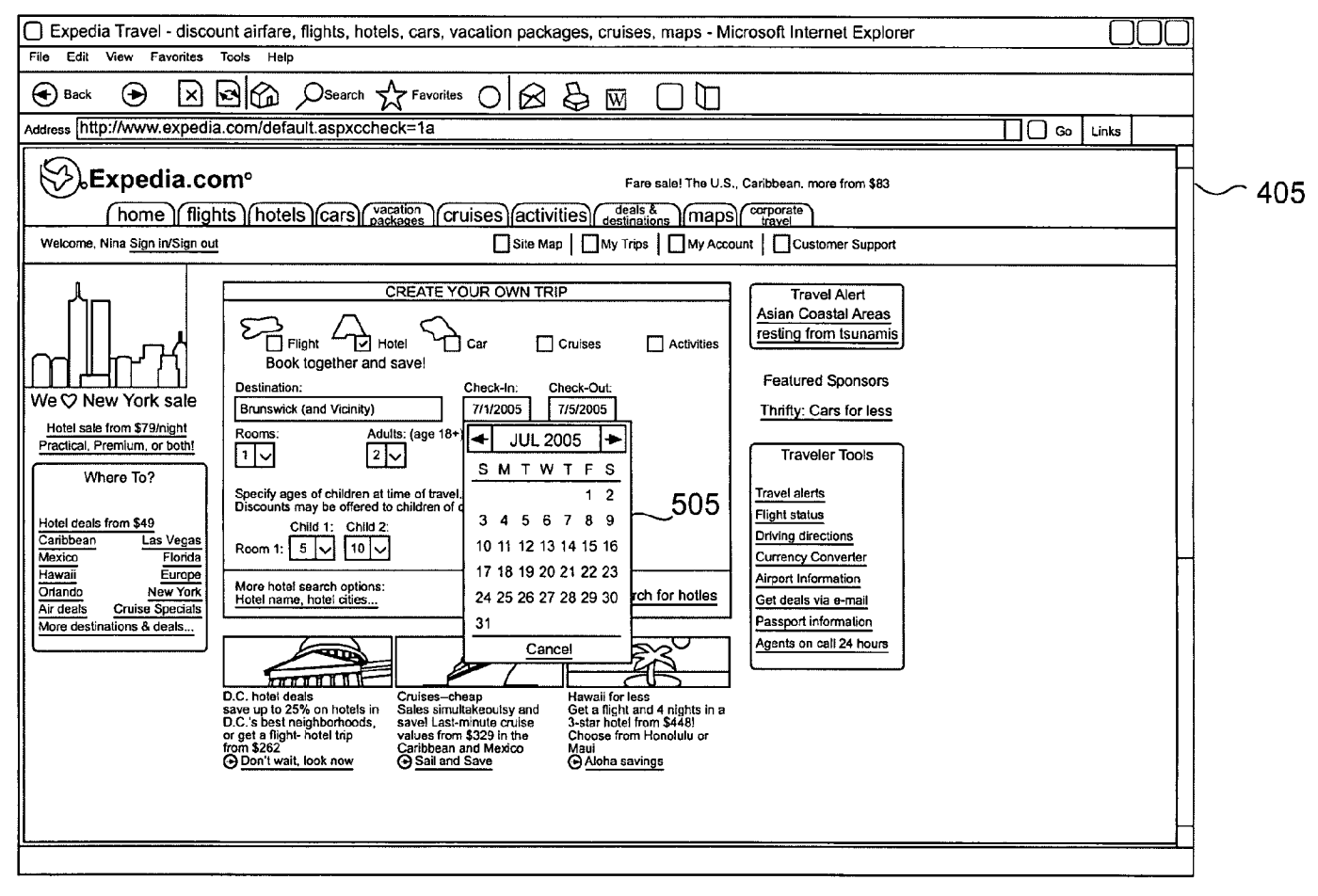

Alternatively, user 115 may use a mouse to select a user selectable element 410 on first window 405. After user selectable element 410 is selected, a second window 505 may be displayed, as shown in FIG. 4. FIG. 4 illustrates that second window 505, for example, may comprise a visual representation of a calendar for a month containing the first night user 115 would like the reservation. The user may then input data into second window 505 by entering a date or selecting a date shown on second window 505. As discussed in detail below, in one embodiment, second window 505 may be adapted to receive a series of data, particularly time-related data, from the user in a more efficient and reliable manner than the systems and methods currently known in the art.

As described with respect to FIG. 3, in displaying first window 405 on client 110, a first communication channel may be established between server 105 and client 110 over network 120. In displaying second window 505 on client 110, however, a second communication channel need not be established between server 105 and client 110 over network 120. In contrast to conventional systems, in displaying second window 505 on client 110, the first communication channel used for exchanging data with first window 405 may also be used for exchanging data with second window 505. For example, when server 105 supplies the first content data configured to cause first window 405 to be displayed on client 110, the second content data corresponding to second window may be transmitted with the first content data and may be stored in memory 130. When user 115 selects user selectable element 410 as described above, server application software module 108 does not supply the second content data and cause second window 505 to be displayed. In contrast, when user 115 selects user selectable element 410 as described above, consistent with an embodiment of the invention, data gathering software module 135 residing on client 110 takes the second content data from memory 130 and causes second window 505 to be displayed on client 110. In this way, a second communication channel may not be required between server 105 and client 110 over network 120 for displaying second window 505 on client 110. Furthermore, any data sent back to server 105 from client 110 may be marked with the same window ID regardless of whether the data was entered in first window 405 or second window 505.

As mentioned above, second window 505 may be adapted to receive data input, or a series of data values, from a user and transfer that information to one or more fields of first window 405. While the methods and systems for data entry are described in regard to entering data into second window 505 for transfer to first window 405, it is understood that this is exemplary only, and that the methods and systems for data entry described herein are not limited to the manner of exchanging data between a client and a server as described above.

Second window 505 may be operative to initially display an array or list of first values from which the user may select. After the user has selected a first value, second window 505 may be configured to automatically load an array of second values. Once the second value has been selected, second window 505 may be operative to load an array of third values, and so forth. Each value entered by the user may be a component of a single field of information requested by first window 405, or each value may correspond to a separate requested field.

In one embodiment, second window 505 may be adapted to receive time entry information from the user. Second window 505 may function to streamline the data collection process in order to alleviate the need for the user to manually type the time information into separate fields or, potentially more burdensome, to scroll through as many as four different drag-down menus to select: (i) the appropriate hour value; (ii) A.M. or P.M.; (iii) the appropriate minute value; and (iv) the appropriate seconds value.

Figure 5:
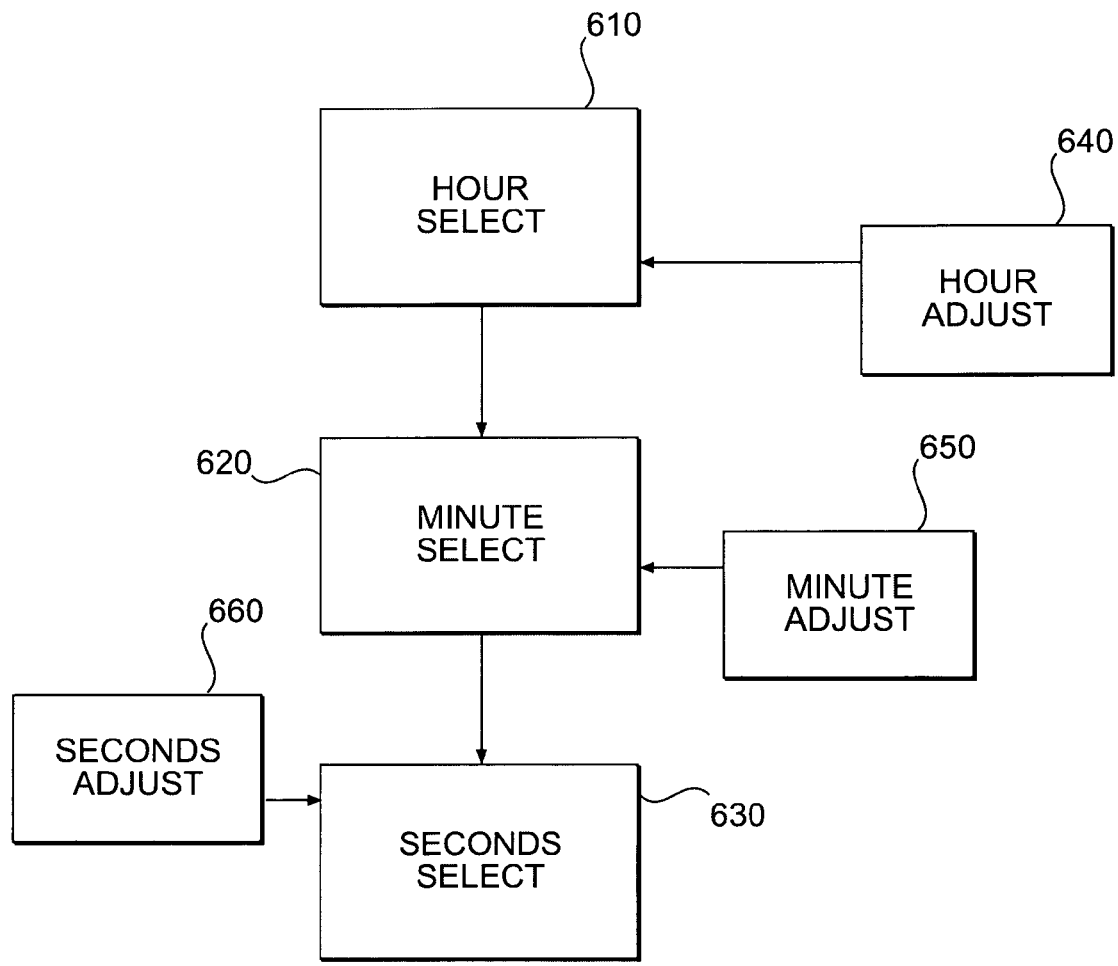
FIG. 5 is a block diagram of an exemplary data entry system consistent with the principles of the present invention.

FIG. 5 is a flow diagram illustrating the function of one embodiment of a streamlined time entry window 505. The user may select an hour value from a list provided (stage 610). The user may also select a minute value (stage 620). The user may also select a seconds value (stage 630). As further illustrated in FIG. 5, a time entry process consistent with an embodiment of the present invention may comprise a number of optional steps. The user may engage an hour adjust feature that allows him to alter the previously selected hour value (stage 640). By engaging the hour adjust feature, the user may be returned to the hour select screen of stage 610. Similarly, the time entry function may include a stage to allow the user to alter the selected minute value at any point in the process (stage 650), and also return the user to the minute selection screen of stage 620. Likewise, the time entry function may include a stage to allow the user to alter the selected seconds value at any point in the process (stage 660), and also return the user to the seconds selection screen of stage 630. Once the user has entered the desired time values, he may finalize the time entry (stage 670). In the embodiment shown in FIG. 5, stage 670 may cause the entered time value to be transferred to a field of first window 405. However, it is understood that this illustration is exemplary in nature, and that the time entry procedure may be configured in a variety of ways and a variety of entry orders consistent with the principles of the present invention.

Figure 6:
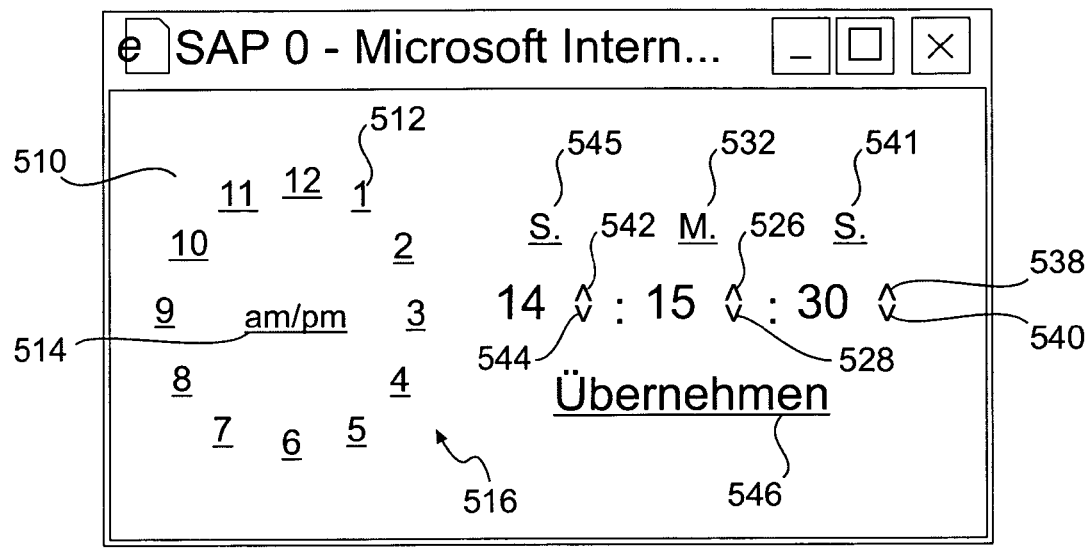
FIG. 6 is a screen shot showing an exemplary initial data entry screen consistent with the principles of the present invention.

FIG. 6 shows an hour selection display 510 of a data entry function consistent with an embodiment of the present invention in which twelve hours are arranged in a substantially circular, "clockwise" fashion, allowing a user to quickly select the desired hour value 512 from the familiar pattern. Second window 505 may provide a link 514 that causes hour display 510 to alternate between A.M. hours 516 and P.M. hours 518. In another aspect, shown in FIGS. 7 and 8, link 514 may alternate hour display 510 between a first set of hours 516 displaying values 1 through 12 and a second set of hours 518 displaying values 13 through 00 (or some other division of twenty-four hours).

Figure 9:
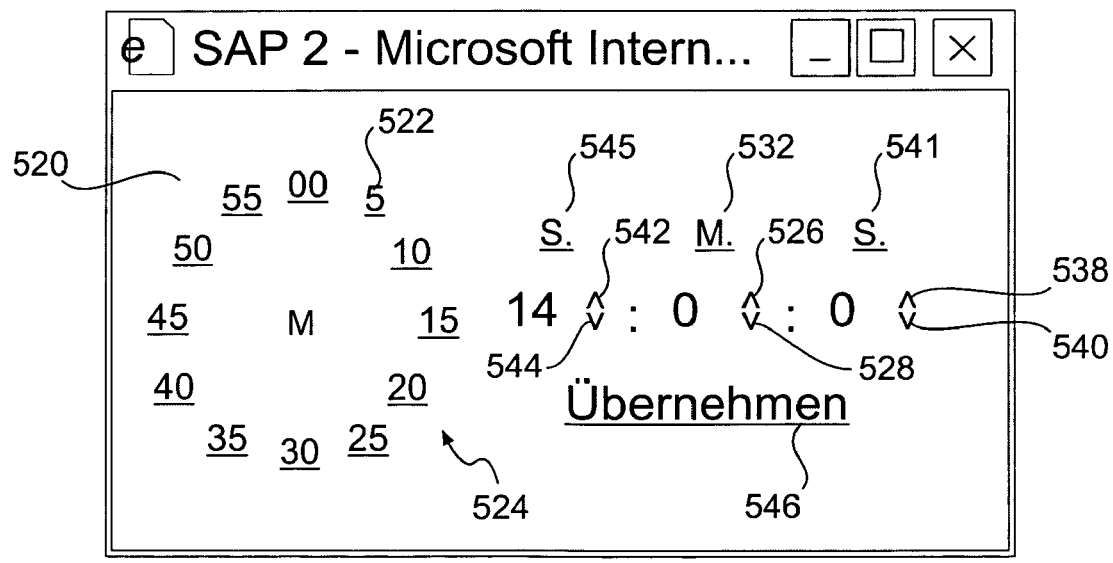
FIG. 9 is a screen shot showing an exemplary data entry screen after performance of a first data entry step in a system consistent with the principles of the present invention.

After the user has selected an hour value 512, second window 505 may be adapted to load a minute display 520 that may allow the user to select the appropriate minute value 522. In one aspect, minute display 520 may be oriented in an analog clock face pattern similar to hour display 510. As shown in FIG. 9, minute display 520 may be arranged in five-minute increments 524. Often, time is entered in multiples of five minutes, and providing selections in five-minute increments 524 may allow the user to quickly select the appropriate entry without cluttering second window 505 with sixty different choices for minute value 522.

In order to provide for occasions in which the user desires to enter a minute value 522 that does not correspond to one of the five-minute increments 524 shown in FIG. 9, second window 505 may provide minute increase/decrease buttons 526, 528, respectively. In this manner, the user may select the five-minute increment 524 closest to the desired value, then use the appropriate minute increase/decrease button 526, 528 to reach the desired minute value 522. Second window 505 may be adapted to load a seconds display 530 after a five-minute increment 524 is chosen. In one version, second window 505 may also be adapted to return to minute display 520 if the user engages one of minute increase/decrease buttons 526, 528. Once the desired minute value 522 is reached using minute increase/decrease buttons 526, 528, the user may select a link 532 to indicate that the desired minute value 522 has been reached and prompt second window 505 to load seconds display 530.

Figure 10:
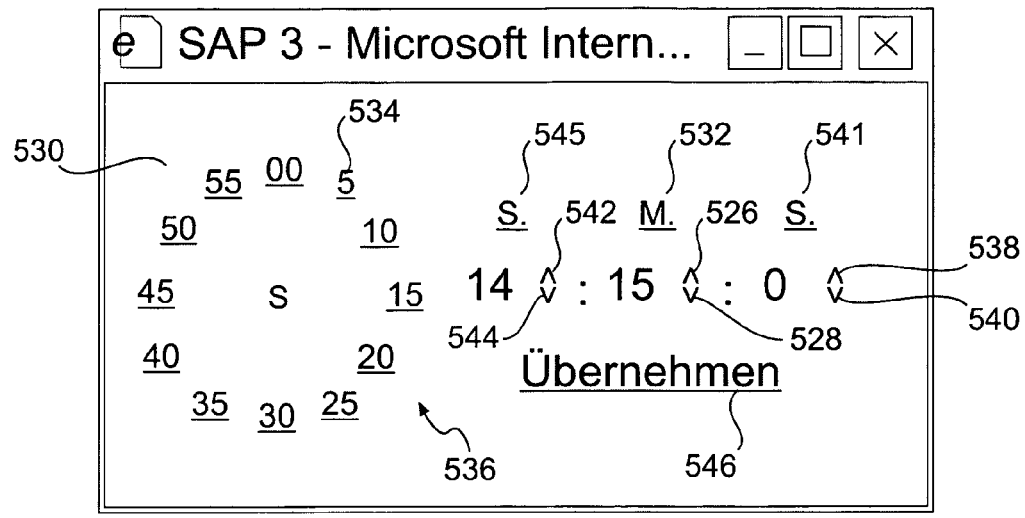
FIG. 10 is a screen shot showing an exemplary data entry screen after performance of a second data entry step in a system consistent with the principles of the present invention.
Figure 11:
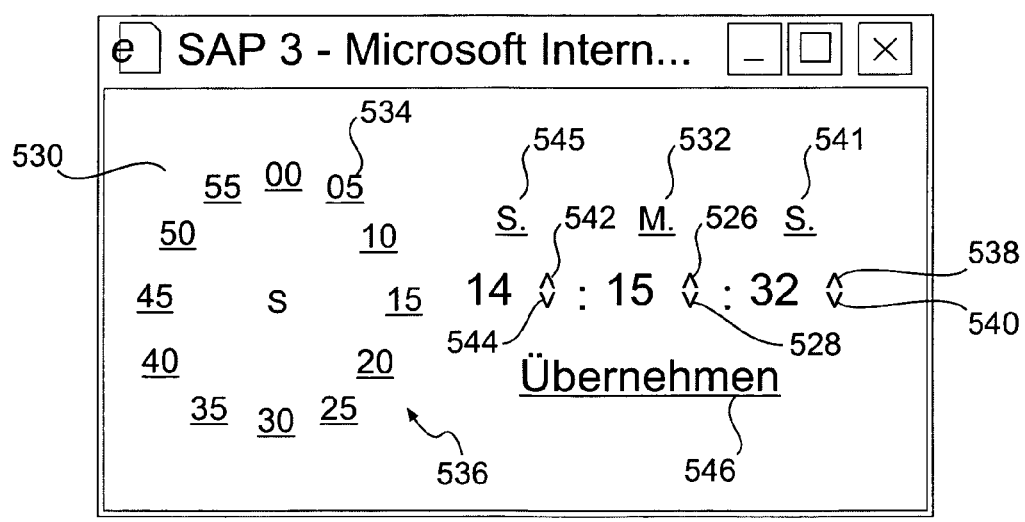
FIG. 11 is a screen shot showing an exemplary data entry screen consistent with the principles of the present invention.

In one aspect, as illustrated in FIG. 10, seconds display 530 may be an analog clock face pattern similar to minute display 520 and allow the user to choose a seconds value 534 from a list of five-second increments 536. The user may be allowed to fine-tune seconds value 534 by engaging seconds increase/decrease buttons 538, 540 in the manner described above in regard to minute selection. After the user has selected the desired second value 534, second window 505 may be adapted to revert to hour display 510. Similar to the minute selection process, if the user engages increase/decrease buttons 538, 540, second window 505 may be adapted to revert back to seconds display 530, as illustrated in FIG. 11. Seconds display 530 may also comprise a link 541 that the user may select to indicate that the desired seconds value 534 has been reached. In certain applications, where the entry of a seconds value 534 is not necessary, seconds display 530 may be omitted.

Figure 7:
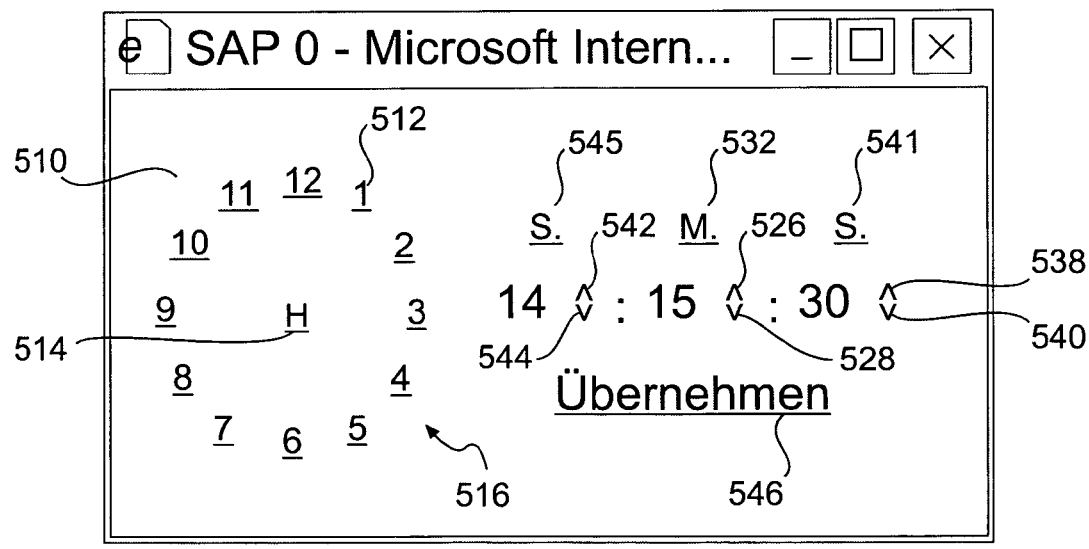
FIG. 7 is a screen shot showing an exemplary initial data entry screen consistent with the principles of the present invention.
Figure 8:
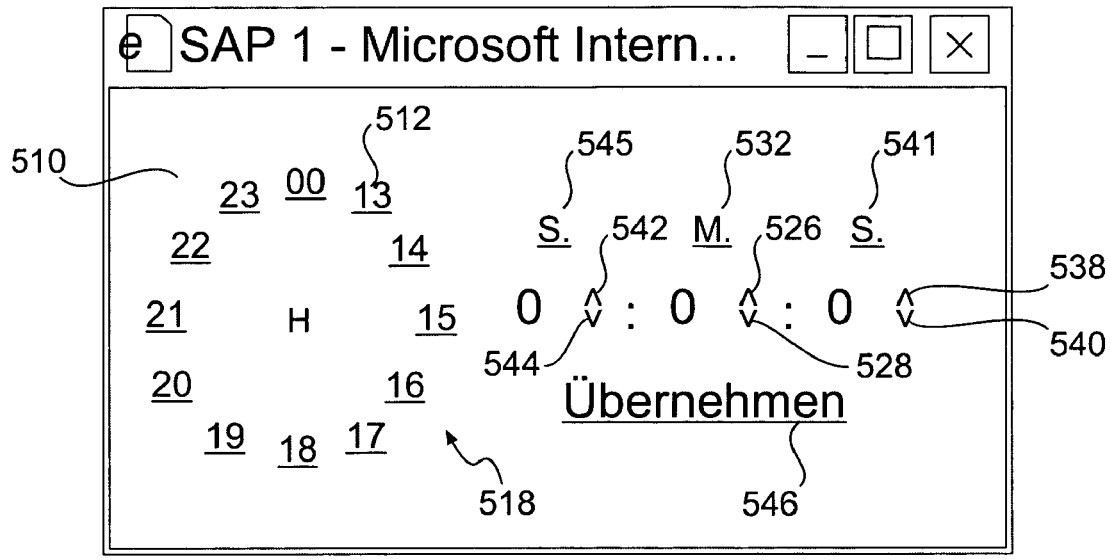
FIG. 8 is a screen shot showing an exemplary initial data entry screen consistent with the principles of the present invention.

Although the exemplary hour displays 510 shown in FIGS. 6 through 8 allow the user to select the appropriate hour directly from hour display 510 without the need for incremental adjustment, a pair of hour increase/decrease buttons 542, 544 may be provided to allow the user to alter the hour selection at any point in the time entry process. Second window 505 may be adapted to load hour display 510 if the user engages either of hour increase/decrease buttons 542, 544 at another step in the data entry process. A link 545 may be provided and selected by the user to indicate that the desired hour value 512 has been reached, and may prompt second window 505 to load minute display 520.

Second window 505 may also comprise a link 546 that the user may select once he has completed the time entry process. Link 546 may be adapted to transfer the time entry from second window 505 to the designated field or fields of first window 405 or directly to a network application. Alternatively, second window 505 may be adapted to automatically transfer the entered data once the user has entered a value for hours, minutes and seconds.

Figure 12:
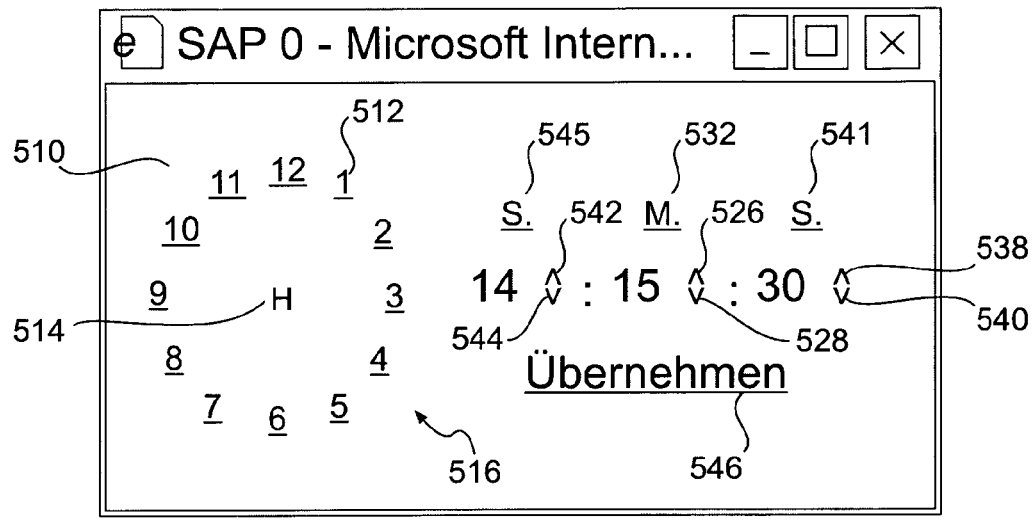
FIG. 12 is a screen shot showing an exemplary structure of an A.M. hour display user interface consistent with the principles of the present invention.
Figure 13:
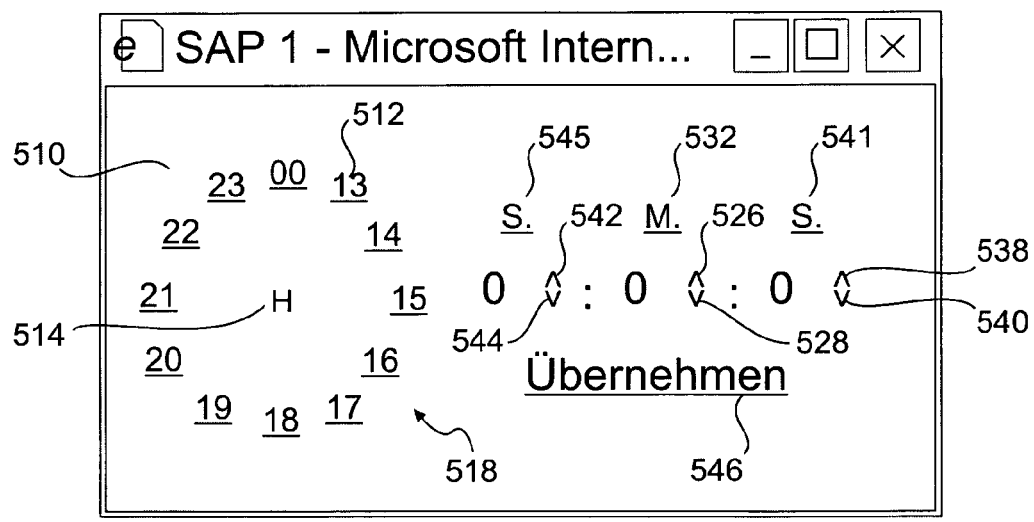
FIG. 13 is a screen shot showing an exemplary structure of a P.M. hour display user interface consistent with the principles of the present invention.

There are numerous variations for the time entry user interface consistent with the present invention. For instance, in one embodiment shown in FIGS. 12 and 13, second window 505 may present a pair of hour displays 510 in sequential order. Hour display 510 may be presented first as an analog clock face showing the A.M. hours (FIG. 12). The user may select the appropriate A.M. hour value 516, or if he desires to select a P.M. hour value 518, he may select a pass link 514 operative to prompt second window 505 to load P.M. hours 518 in hour display 510 (FIG. 13). If the user does select an A.M. hour value 516, hour display 510 may be adapted to load P.M. hours 518, and the user may select link 545 to indicate that he does not wish to select a P.M. hour, thereby prompting second window 505 to load minute display 520. Alternatively, if the user selects an A.M. hour value 516, second window 505 may be adapted to load minute display 520 without loading P.M. hours 518, eliminating the requirement for the user to select link 545.

Figure 14:
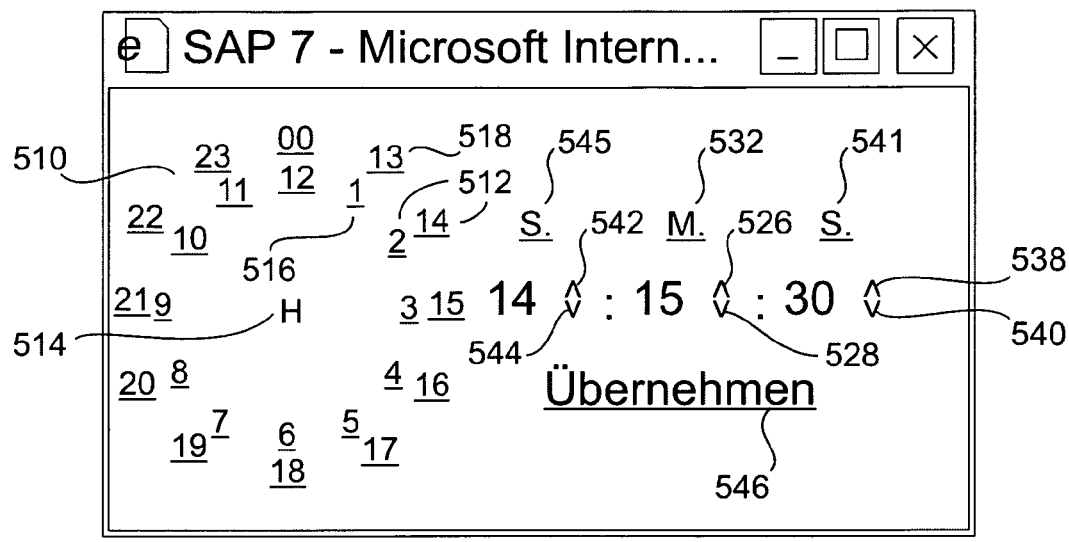
FIG. 14 is a screen shot showing an alternative exemplary structure of an hour display user interface consistent with the principles of the present invention.
Figure 15:
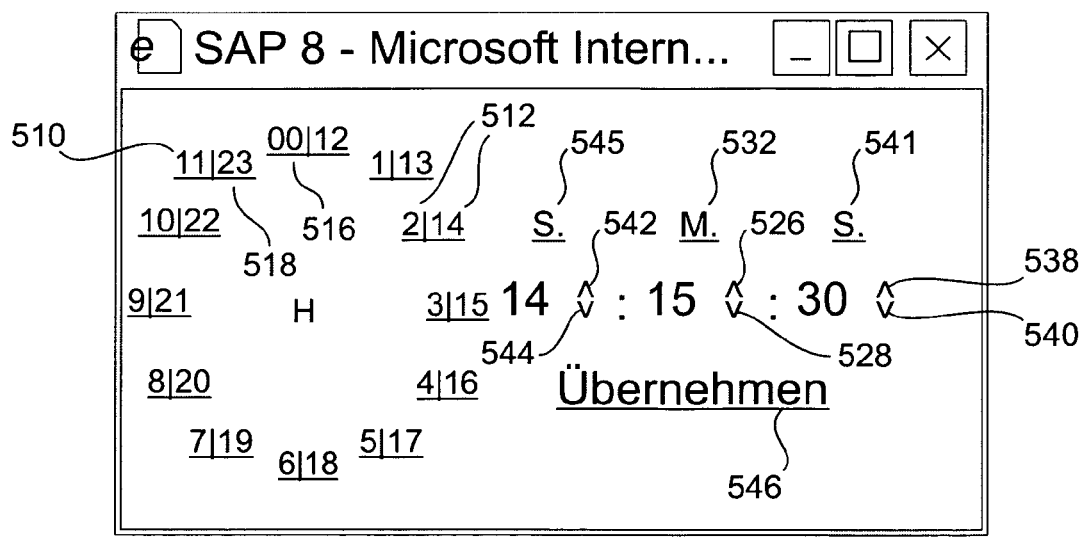
FIG. 15 is a screen shot showing an alternative exemplary structure of an hour display user interface consistent with the principles of the present invention.

In another version, in order to avoid the need for the user to pass through two consecutive hour displays 510 or to select an A.M./P.M. link, hour display 510 may simultaneously present both A.M. hours 516 and P.M. hours 518. Second window 505 may be adapted to load minute display 520 once the user selects an hour value 512 from either A.M. hours 516 or P.M. hours 518. This embodiment may be presented in a number of ways. For example, as shown in FIG. 14, hour display 510 may comprise a single analog clock face in which the corresponding A.M. and P.M. hours 516, 518 are displayed side-by-side (i.e. 2 a.m./2 p.m. or 2/14). In another version, shown in FIG. 15, hour display 510 may comprise concentric analog clock faces, one showing A.M. hours 516 and one showing P.M. hours 518.

Figure 16:
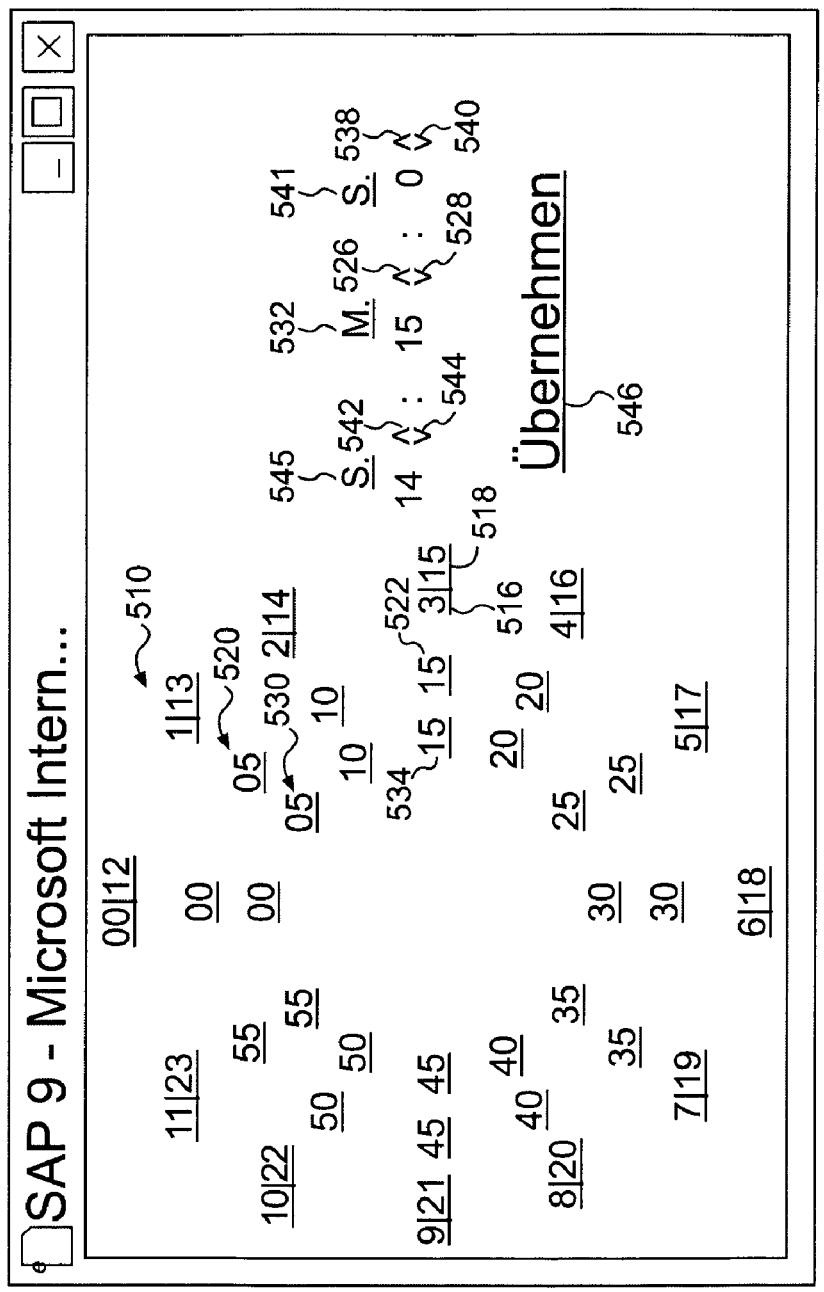
FIG. 16 is a screen shot showing an exemplary structure of a user interface consistent with the principles of the present invention displaying an hour display, a minute display and a seconds display.

In yet another embodiment of the data entry graphic user interface, second window 505 may be operative to display hour display 510, minute display 520 and seconds display 530 simultaneously. Like the embodiments previously described, this version may be accomplished in numerous ways. In one aspect, shown in FIG. 16, the respective hour, second and minute choices may be presented as concentric circles. Hour display 510 may be presented as an analog clock face showing either A.M. hours 516, P.M. hours 518, or both. If hour display 510 shows only A.M. hours 516 or P.M. hours 518, a link (not pictured) may be included to allow the user to alternate from A.M. to P.M. Minute display 520 may also be presented as an analog clock face, and may be contained inside the perimeter of hour display 510. Seconds display 530 may likewise be displayed as an analog clock face, and may be contained inside the perimeter of minute display 520. In this embodiment, the user may select an hour value 512, a minute value 522 and a seconds value 534 within a single display, and second window 505 may not be required to separately load arrays for each of the hour, minute and seconds values.

Alternatively, second window 505 may provide hour display 510, minute display 520 and seconds display 530 simultaneously, but may present the displays in a manner other than concentric circles. For example, hour display 510, minute display 520 and seconds display 530 may all be presented as analog clock faces, but rather than being concentric to one another, they may be side-by-side or arranged vertically.

In another embodiment consistent with the present invention (not pictured), second window 505 may function as a date entry graphic user interface. In one version, second window 505 may first load a predetermined listing of years from which the user may select, such as, for example, every year between 1970 and 2000. After the user selects the desired year value, second window 505 may be adapted to load a list of months, either all twelve months or some portion of them as necessary for the particular application. After the user selects the appropriate month, second window 505 may be adapted to load a listing of the days in the selected month from which the user may choose. Similar to the time entry embodiment described above, the date entry embodiment may comprise increase/decrease buttons for the year, the month, and the day to allow the user to change each of those values at any point in the date entry process.

In one version, second window 505 may present the month or day values to the user before the year values. Depending on the manner of use, month or day values may change more frequently than year values, and the system may be operative to save the user a step by allowing him to choose the appropriate month and day in the manner described above, and by further displaying a default year that the user does not have to change unless necessary. Also, a date entry user interface may incorporate the various embodiments of data entry user interfaces described above in regard to time entry interfaces, including versions in which the year, month and date values are displayed in second window 505 simultaneously, so that second window 505 is not required to load multiple screens.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for exchanging data between a client and a server, the method comprising:

opening a communication channel between the client and the server;

transmitting first content data and second content data from the server to the client through the communication channel, wherein the first content data is configured to cause a first window to be displayed on the client, the first window comprising at least one user selectable element transmitting first content data and second content data from the server to the client through the communication channel, wherein the first content data is configured to cause a first window to be displayed on the client, the first window comprising at least one user selectable element and being associated with a first window ID;

storing the second content data in a memory storage of the client;

retrieving the second content data from the memory storage in response to a selection of the user selectable element of the first window to cause a second window to be displayed on the client, wherein the second window is displayed simultaneously on the client with the first window;

receiving, from the client, input data entered in the second window;

associating the input data entered in the second window with the first window ID;

transmitting, to the server through the first window displayed on the client through the communication channel, the input data entered in the second window; and wherein transmitting the input data entered in the second window further through the communication channel comprises transmitting the input data being associated with a first window ID corresponding to the first window, the first window ID comprising a hypertext markup language (HTML) window ID.

2. The method of claim 1, further comprising entering input data into the second window and transmitting the input data from the client to the server through the communication channel.

3. The method of claim 1, further comprising transmitting to the server through the communication channel a request from the client for the first window.

4. The method of claim 1, wherein transmitting the input data entered in the second window through the communication channel further comprises transmitting the input data being responsive to a data request made by the first window.

5. A system for exchanging data between a client and a server, the system comprising:
   a memory storage for maintaining a database; and
   a processing unit coupled to the memory storage, wherein the processing unit is operative to receive first content data and second content data from a server over a communication channel, the first content data configured to cause a first window to be displayed on the client, the first window comprising at least one user selectable element configured to prompt, when selected, the second content data to cause a second window to be displayed on the client, wherein the first window is associated with a first window ID, and the second window is displayed simultaneously on the client with the first window;
   store the second content data received from the server through the communication channel in the memory storage and further being operative to retrieve the second content data from the memory storage in response to selection of the user selectable link of the first window to display the second window on the client;
   receive, from the client, input data entered in the second window;
   associate the input data entered in the second window with the first window ID;
   transmit, to the server through the first window displayed on the client through the communication channel, the input data entered in the second window; and
   wherein the processing unit being operative to transmit the input data entered in the second window to the server through the communication channel further comprises the processing unit being operative to transmit the input data being associated with a first window ID corresponding to the first window, the first window ID comprising a hypertext markup language (HTML) window ID.

6. The system of claim 5, the processor unit further being operative to accept data input by the user into the second window, and further being operative to transmit the input data from the client to the server through the communication channel.

7. The system of claim 5, further comprising the processing unit being operative to transmit to the server through the communication channel a request for the first window.

8. The system of claim 5, wherein the processing unit being operative to transmit the input data entered in the second window to the server through the communication channel further comprises the processing unit being operative to transmit the input data being responsive to a data request made by the first window.

9. A non-transitory computer-readable medium which stores a set of instructions which when executed performs a method for exchanging data between a client and a server, the computer-readable medium executed by the set of instructions comprising:
   opening a communication channel between the client and the server;
   receiving on the client first content data and second content data from a server through the communication channel, the first content data configured to cause a first window to be displayed on the client, the first window being associated with a first window ID and comprising at least one user selectable element configured to prompt, when selected, the second content data to cause a second window to be displayed on the client, wherein the second window is displayed simultaneously on the client with the first window; and
   storing the second content data in a memory storage of the client and retrieving the second content data from the memory storage in response to selection of the user selectable link of the first window to cause the second window to be displayed on the client;
   receiving, from the client, input data entered in the second window;
   associating the input data entered in the second window with the first window ID;
   transmitting, to the server through the first window displayed on the client through the communication channel, the input data entered in the second window;
   wherein transmitting the input data entered in the second window further through the communication channel comprises transmitting the input data being associated with a first window ID corresponding to the first window, the first window ID comprising a hypertext markup language (HTML) window ID.

10. The non-transitory computer-readable medium of claim 9, further comprising entering input data into the second window and transmitting the input data from the client to the server through the communication channel.

11. The non-transitory computer-readable medium of claim 9, further comprising transmitting to the server through the communication channel a request from the client for the first window.

* * * * *